(12) United States Patent
Kushwaha et al.

(10) Patent No.: US 6,970,917 B1
(45) Date of Patent: Nov. 29, 2005

(54) SYSTEM AND METHOD FOR REMOTE CONTROL AND MANAGEMENT OF WIRELESS DEVICES

(75) Inventors: Rakesh Kushwaha, Marlboro, NJ (US); Badri Nath, Edison, NJ (US)

(73) Assignee: Mformation Technologies Inc., Edison, NJ (US)

( * ) Notice: Subject to any disclaimer, the term of this patent is extended or adjusted under 35 U.S.C. 154(b) by 791 days.

(21) Appl. No.: 09/925,536

(22) Filed: Aug. 10, 2001

Related U.S. Application Data

(60) Provisional application No. 60/251,034, filed on Dec. 5, 2000.

(51) Int. Cl.[7] .............................................. G06F 15/26
(52) U.S. Cl. ........................ 709/217; 709/223; 455/425
(58) Field of Search ................................. 709/217, 225, 709/223, 238; 455/405, 406, 440, 443, 423–425; 705/1

(56) References Cited

U.S. PATENT DOCUMENTS 5,819,177 A * 10/1998 Vucetic et al. .............. 455/425
6,208,853 B1 * 3/2001 LoVasco et al. ........... 455/414.1
6,441,747 B1 * 8/2002 Khair et al. ............ 340/870.16
2002/0059449 A1 * 5/2002 Wandel et al. .............. 709/238

FOREIGN PATENT DOCUMENTS

WO    WO 94/30023    * 12/1994

* cited by examiner

Primary Examiner—Kamini Shah
(74) Attorney, Agent, or Firm—Swidler Berlin LLP

(57) ABSTRACT

A method, system, and computer program product that provides the capability to manage, control, and reconfigure wireless devices remotely over a wireless network with acceptable reliability and security. In one embodiment, the method for remotely managing a wireless device over a wireless network comprising a server and the wireless device, the wireless network operable to communicatively connect the server and the wireless device, comprises the steps of: transmitting registration information relating to the wireless device from the wireless device to the server, verifying the registration information at the server, establishing a mailbox for the wireless device at the server, placing a command for the wireless device in the mailbox, delivering the command from the mailbox to the wireless device, and executing the command at the wireless device.

48 Claims, 5 Drawing Sheets

SYSTEM AND METHOD FOR REMOTE CONTROL AND MANAGEMENT OF WIRELESS DEVICES

CROSS-REFERENCE TO RELATED APPLICATIONS

The benefit of provisional application 60/251,034, filed Dec. 5, 2000, under 35 U.S.C. § 119(e), is hereby claimed.

FIELD OF THE INVENTION

The present invention relates to a system and method for managing, controlling, and reconfiguring wireless devices remotely over a wireless network

BACKGROUND OF THE INVENTION

Currently, there are various implemented and proposed protocols to manage, control, and reconfigure computer systems remotely over a network via a central console. Such protocols are designed for an environment in which the computer systems to be managed are connected to the central console by fixed wiring, such as twisted pair wire, coaxial cable, or fiber optic cable. Management and control methods for networks that utilize fixed wiring assume that the network is quite reliable. In addition, many protocols are designed for a controlled network environment, such as a local area network, in which the computing environment is secure. Such security may be provided by use of a firewall to connect the local area network to other networks.

However, networks utilizing fixed wiring are limited in that in mobile devices cannot be configured onto a fixed network and so cannot be utilized. In addition, in many situations, the installation of the fixed wiring may be expensive or infeasible. Wireless networks provide these capabilities that fixed networks lack. Thus, a need arises for a technique that will allow computer systems to be remotely managed, controlled, and reconfigured using a wireless network. Network considerations in a wireless network are different that those in a fixed network. For example, wireless connections are not as reliable as fixed connections, due to interference and other reception difficulties. In addition, security considerations in a wireless network are different, in that wireless signals carrying data are much more subject to interception than are signals carrying data in a fixed network. A need arises for a technique that provides the capability to manage, control, and reconfigure wireless devices remotely over a wireless network with acceptable reliability and security.

SUMMARY OF THE INVENTION

The present invention is a method, system, and computer program product that provides the capability to manage, control, and reconfigure wireless devices remotely over a wireless network with acceptable reliability and security. In one embodiment, the present invention is a method for remotely managing a wireless device over a wireless network comprising a server and the wireless device, the wireless network operable to communicatively connect the server and the wireless device, the method comprising the steps of: transmitting registration information relating to the wireless device from the wireless device to the server, verifying the registration information at the server, establishing a mailbox for the wireless device at the server, placing a command for the wireless device in the mailbox, delivering the command from the mailbox to the wireless device, and executing the command at the wireless device.

In one aspect of the present invention, the delivering step comprises the steps of: establishing a connection between the wireless device and the server, transmitting a request for contents of the mailbox from the wireless device to the server, and transmitting the contents of the mailbox from the server to the wireless device. The connection may be established periodically or the connection may be established based on a threshold condition.

In one aspect of the present invention, the delivering step comprises the steps of: establishing a connection between the wireless device and the server, transmitting the contents of the mailbox from the server to the wireless device without a request from the wireless device, and accepting the contents of the mailbox at the wireless device. The connection may be established periodically or the connection may be established based on a threshold condition.

In one aspect of the present invention, the command comprises one of: enabling/disabling access of the wireless device to the server, enabling/disabling applications that may run on the wireless device, erasing all or part of contents of the wireless device, transmitting new programs and data to the wireless device, querying a current state of the wireless device, monitoring a level of a battery in the wireless device, and monitoring the location of the wireless device in the wireless network.

In one aspect of the present invention, the method further comprises the step of transmitting information relating to execution of the command at the wireless device from the wireless device to the server. The information relating to execution of the command may be transmitted periodically or the information relating to execution of the command may be transmitted based on a threshold condition of the wireless device.

In another embodiment, the present invention is a method for remotely managing a wireless device over a wireless network comprising the steps of: receiving registration information from the wireless device, verifying the received registration information, placing a command for the wireless device in a mailbox, and delivering the command to the wireless device.

In one aspect of the present invention, the delivering step comprises the steps of: establishing a connection with the wireless device, receiving a request for contents of the mailbox from the wireless device, and transmitting the contents of the mailbox to the wireless device. The connection may be established periodically or the connection may be established based on a threshold condition.

In one aspect of the present invention, the delivering step comprises the steps of establishing a connection with the wireless device and transmitting the contents of the mailbox to the wireless device without a request from the wireless device. The connection may be established periodically or the connection may be established based on a threshold condition.

In one aspect of the present invention, the command comprises one of: enabling/disabling access of the wireless device to the server, enabling/disabling applications that may run on the wireless device, erasing all or part of contents of the wireless device, transmitting new programs and data to the wireless device, querying a current state of the wireless device, monitoring a level of a battery in the wireless device, and monitoring the location of the wireless device in the wireless network.

In one aspect of the present invention, the method further comprises the step of receiving information relating to execution of the command at the wireless device from the wireless device.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
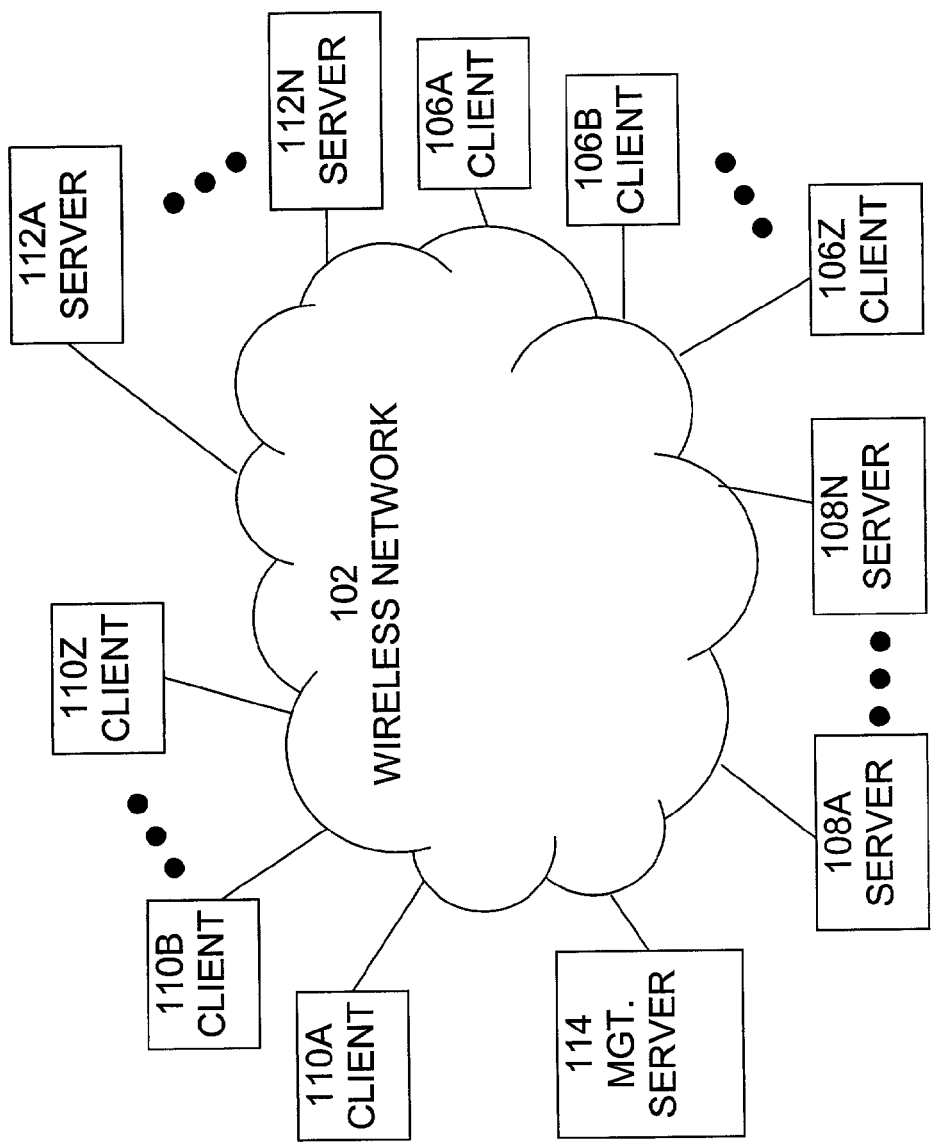
FIG. 1 is an exemplary block diagram of a network system in which the present invention may be implemented.

An exemplary block diagram of a network system 100 in which the present invention may be implemented is shown in FIG. 1. Network system 100 includes wireless network 102. Wireless network 102 provides communicative interconnection of a plurality of devices, such as client systems 106A–106Z and 110A–110Z and servers 108A–108N and 112A–112N. The transmission media in a wireless network is typically electromagnetic radiation, such as radio waves or light. Wireless network 102 may include one or more local area networks (LANs), one or more wide area networks (WANs), or both LANs and WANs. One or more networks may be included in wireless network 102 and may include both public networks, such as the Internet, and private networks and may utilize any networking technology and protocol, such as Ethernet, Token Ring, Transmission Control Protocol/Internet Protocol (TCP/IP), etc. Although not shown in FIG. 1, wireless network 102 may connect, interconnect, or interface with one or more other wireless networks or with one or more wireline networks. The transmission media in a wireline network is wire, such as copper wire, or the equivalent of wire, such as fiber optic cable. Wireline networks may include one or more local area networks (LANs), one or more wide area networks (WANs), or both LANs and WANs. The wireline networks may include both public networks, such as the Internet, and private networks and may utilize any networking technology and protocol, such as Ethernet, Token Ring, Transmission Control Protocol/Internet Protocol (TCP/IP), etc.

Client systems 106A–106Z and 110A–110Z may include any type of electronic data processing system or communication device. Examples of such electronic data processing system include personal computer systems, such as desktop or laptop computers, workstation computer systems, server computer systems, networks of computer systems, personal digital assistants (PDAs), wireless communications devices, such as cellular telephones, etc. In an embodiment in which the client systems are computer systems, the computer systems may connect directly to network 102, or the computer systems may connect indirectly to network 102 through one or more other networks, gateways, firewalls, etc. Likewise, the connection to network 102 may be wired, wireless, or a combination of wired and wireless. In an embodiment in which the client systems are other types of devices, such as PDAs or wireless devices, the connection to network 102 may be direct or indirect, wired, wireless, or a combination of wired and wireless, as is appropriate. Typically, the user interface of client systems 106A–106Z and 110A–110Z is a graphical user interface, but other interfaces may be used as well. For example, the client systems may include conventional landline telephones or cellular telephones communicatively connected to a touch-tone response unit or a voice response unit, which accepts touch-tone or voice commands and transmits them over network 102 and which receives responses over network 102, converts the received responses to audio, and transmits the received responses to the client systems.

Management server 114 is also communicatively connected to network 102. Management server 114 interfaces with wireless network 102 and with multiple servers and clients that are connected to network 102 and provides remote management of those servers and client over wireless network 102.

Figure 2:
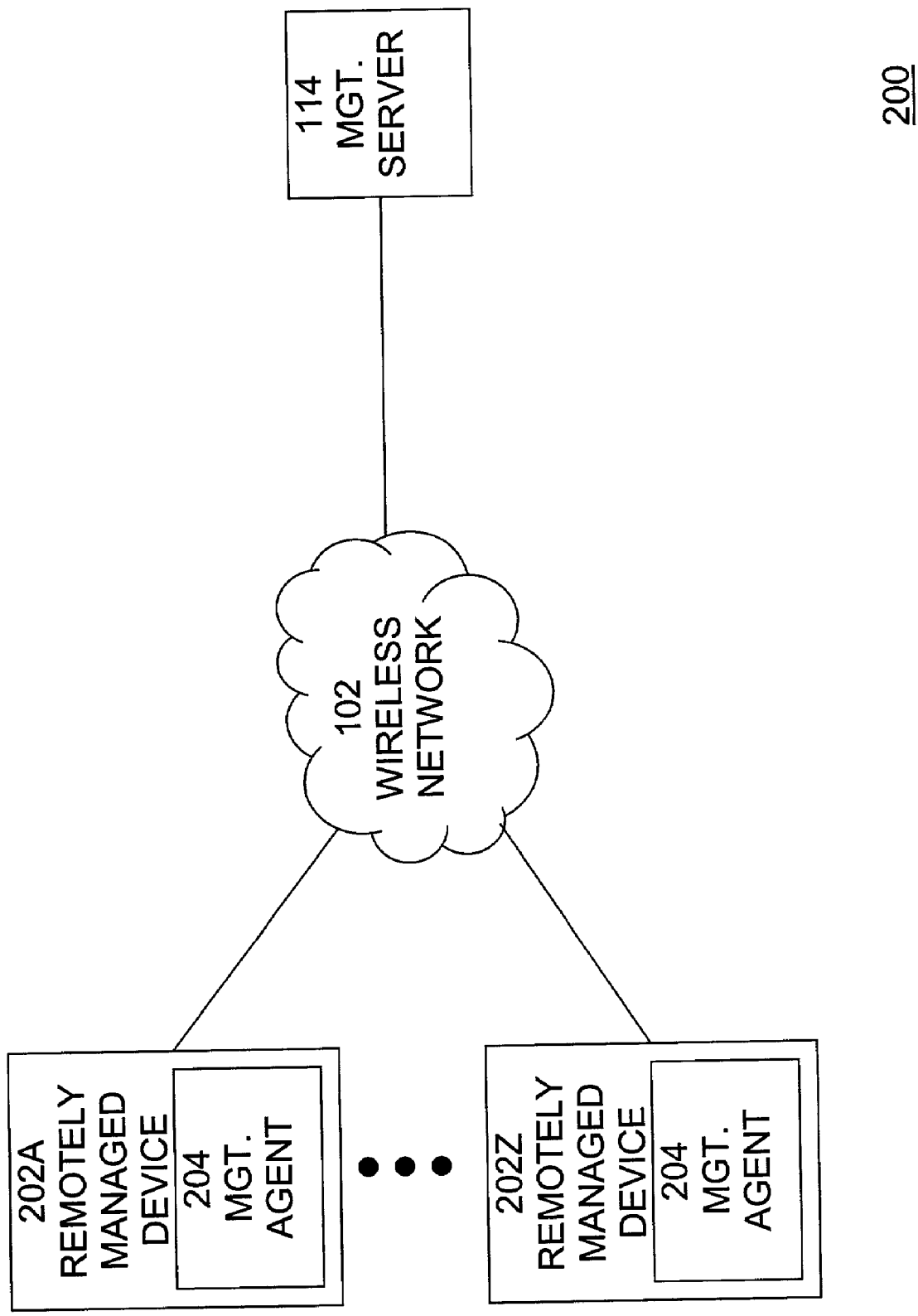
FIG. 2 is an exemplary block diagram of a wireless network system 200 incorporating the remote management technique of the present invention.

An exemplary block diagram of a wireless network system 200 incorporating the remote management technique of the present invention is shown in FIG. 2. System 200 includes wireless network 102, management server 112 and a plurality of remotely managed devices 202A–202Z. Remotely managed devices 202A–202Z may include both client and server systems shown in FIG. 1. Each remotely manage device includes a management agent 204, which is typically a software process that provides the capability for management server 114 to remotely manage the device. Management server 114 communicates with the each remotely managed device using wireless network 102. The information that is communicated is directed to or originated from the management agent that is running on the device. Management server 114 typically transmits commands to each remotely managed device. These commands are directed to the management agent running on the device and are then carried out on the device under the control of the management agent. Typical commands that may be transmitted from management server 114 are enabling/disabling access of the remotely managed device to the server, enabling/disabling applications that may run on the remotely managed device, erasing all or part of the device contents, such as programs and data, transmitting new programs and data to a device, querying the current state of the device, etc. Some commands cause the remotely managed device to transmit data to management server 114. In this situation, the management agent on the device originates a transmission of the data to management server 114 over wireless network 102.

Figure 3:
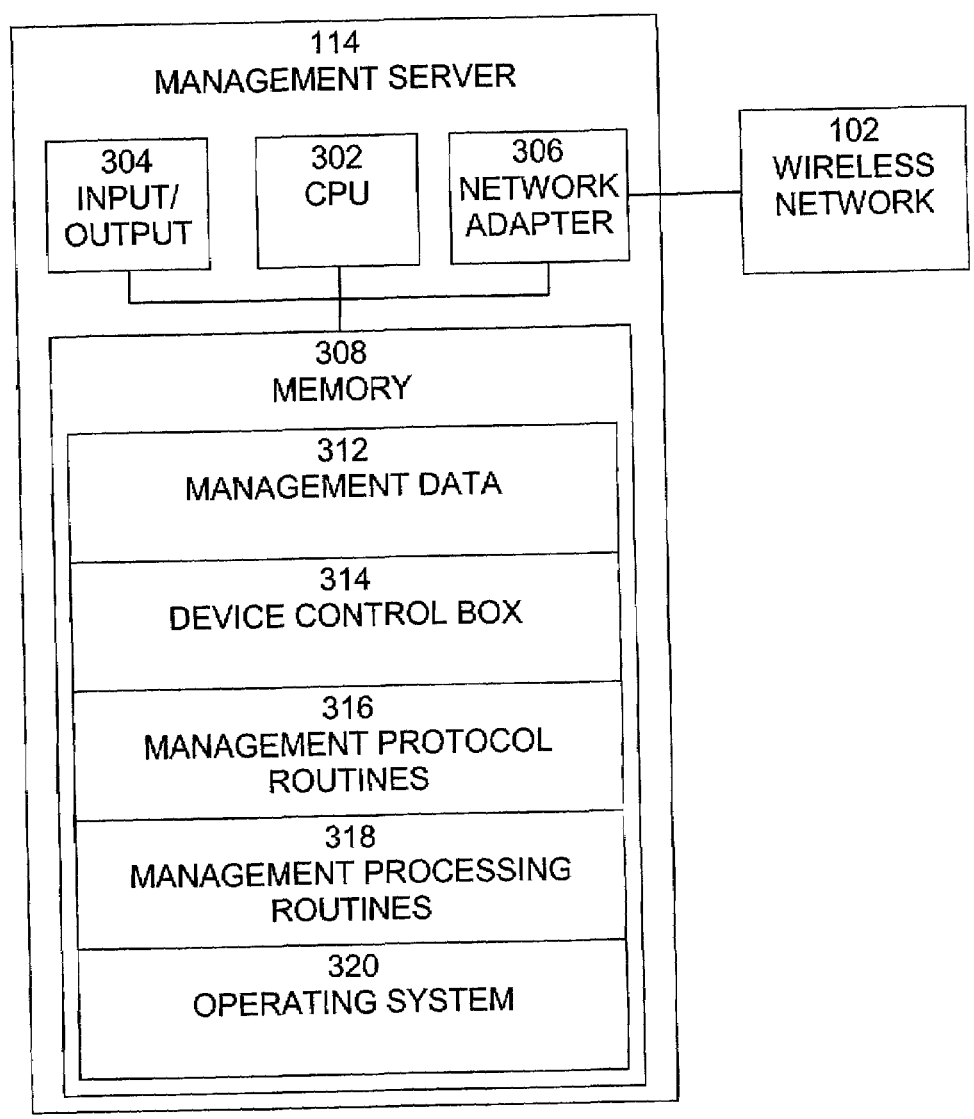
FIG. 3 is an exemplary block diagram of management server shown in FIG. 1.

An exemplary block diagram of management server 114 is shown in FIG. 3. Management server 114 is typically a programmed general-purpose computer system, such as a personal computer, workstation, server system, and minicomputer or mainframe computer. Management server 114 includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. FIG. 3 illustrates an embodiment in which management server 114 is implemented as a single processor computer system. However, the present invention contemplates embodiments in which management server 114 is implemented as a multi-processor system, in which multiple processors 302A–402N share system resources, such as memory 308, input/output circuitry 304, and network adapter 306. The present invention also contemplates embodiments in which management server 114 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces management server 114 with wireless network 102, shown in FIG. 1.

Memory 308 stores program instructions that are executed by, and data that are used and processed by, CPU 302 to perform the functions of the present invention. Memory 308 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes management data 312, mailbox 314, management protocol routines 316, management processing routines 318, and operating system 320. Management data 312 includes data relating to each remotely managed device being managed by management server 114. Management data 312 includes data such as the current state and identity of each remotely managed device. This data is obtained from the management agent running on each remotely managed device. Mailbox 314 stores commands that are to be delivered to remotely managed devices so that the devices can retrieve the commands. Management protocol routines 316 include software that implements the protocols that communicate the remote management commands to devices over wireless network 102. Management processing routines 318 include software that receives or determines the remote management commands that are to be communicated to the remotely managed devices by management protocol routines 314. Operating system 320 provides overall system functionality.

Figure 4:
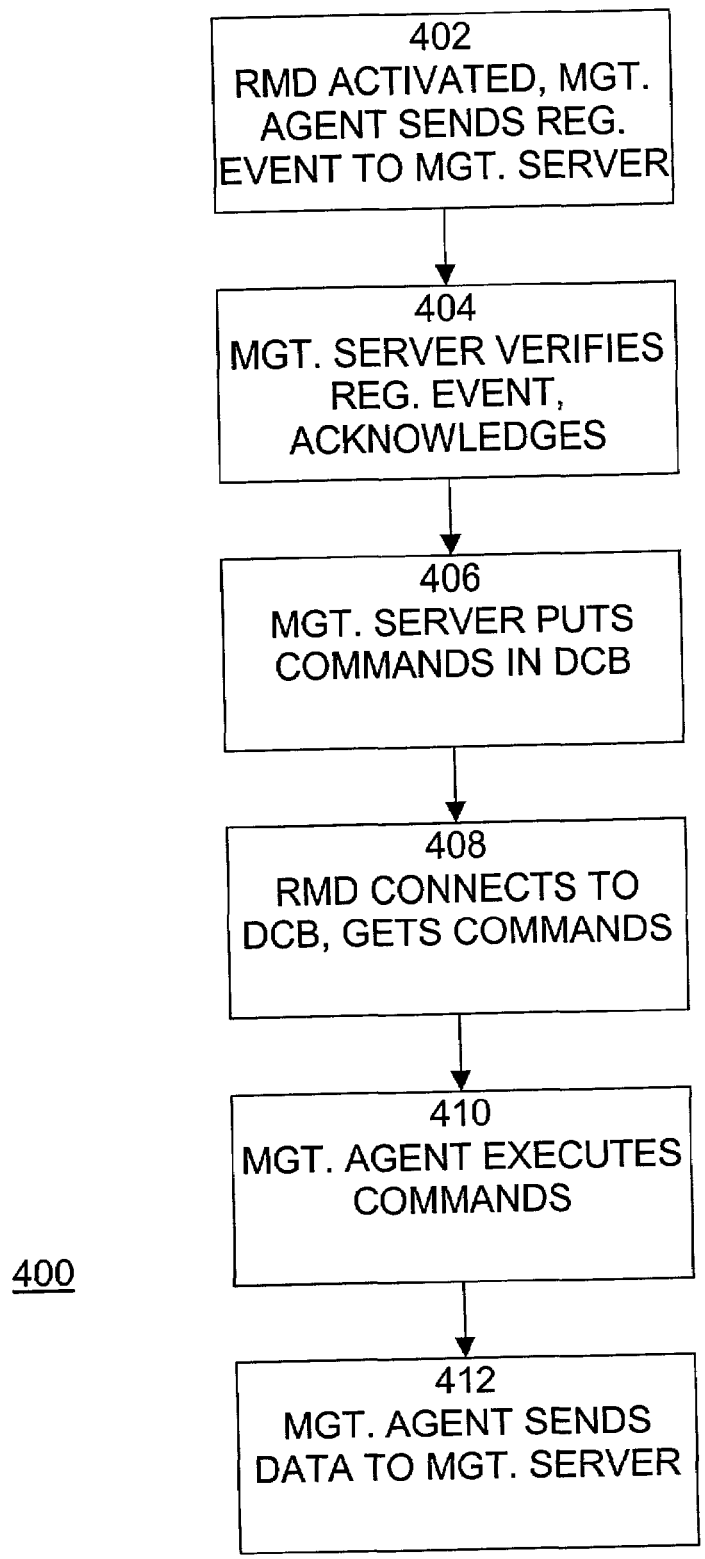
FIG. 4 is an exemplary flow diagram of a process for remotely managing devices over a wireless network, according to the present invention.
Figure 5:
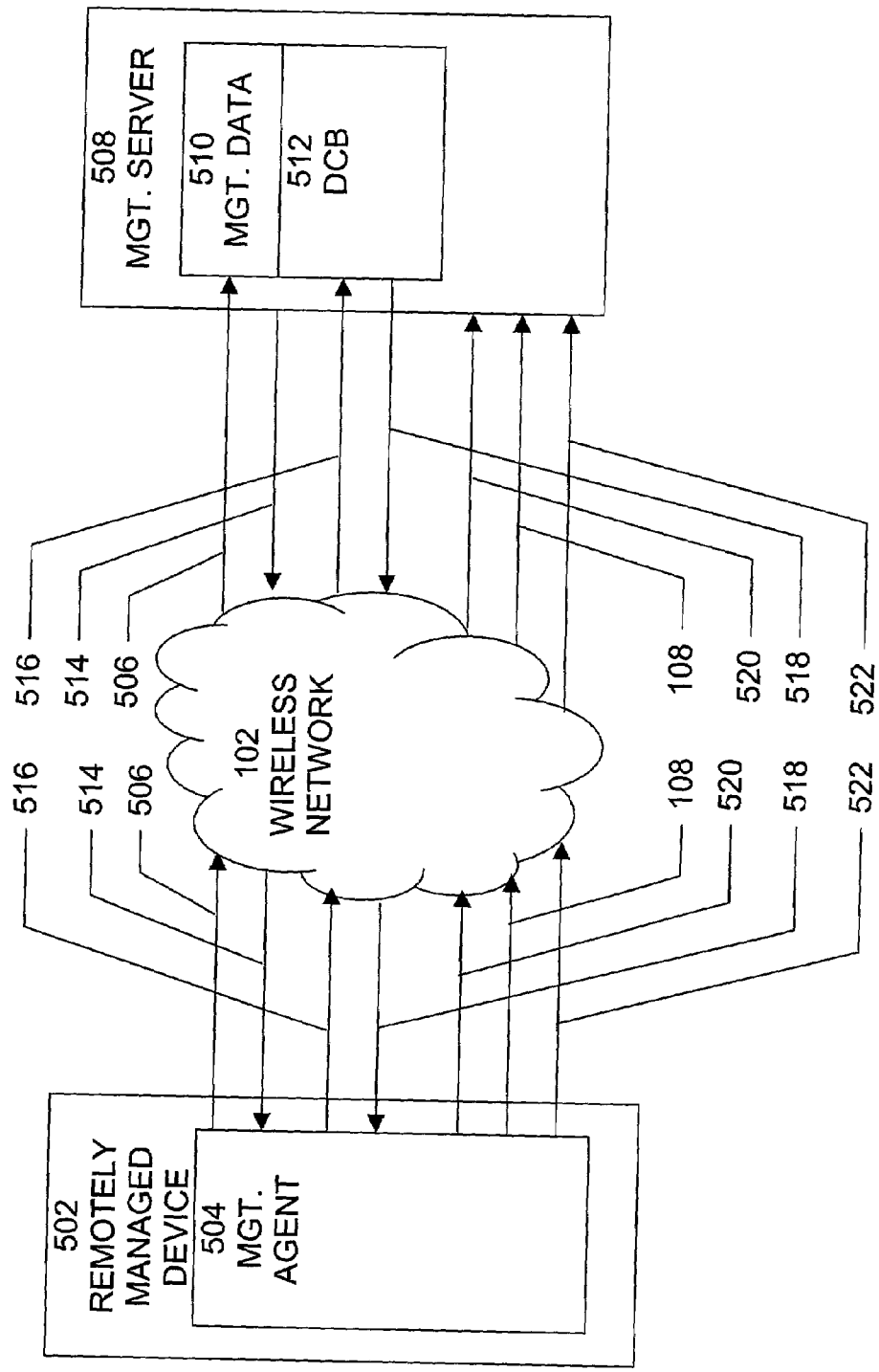
FIG. 5 is a data flow diagram of the operation of the process shown in FIG. 4.

A process 400 for remotely managing devices over a wireless network, according to the present invention, is shown in FIG. 4. It is best viewed in conjunction with FIG. 5, which is a data flow diagram of the operation of process 400. Process 400 begins with step 402, in which a remotely managed device, such as remotely managed device 502, is activated. Device 502 runs management agent 504, which transmits registration event message 506 to management server 508. Registration event message 506 includes information identifying device 502 and information relating to the state of the device. Registration event message 506, and all communications between device 502 and management server 508, is transmitted using a security protocol that ensures that only authorized remotely managed devices, running authorized management agents, can communicate with management server 506. Preferably, the security mechanism used is based on public key encryption, but any other security mechanism that provides adequate security may also be used.

In step 404, the management server verifies the registration event by checking the validity of the information contained in registration event message 506. In particular, management server 508 verifies the identity of remotely managed device 502. Upon verification of device 502, management server 508 registers device 502 by storing registration information relating to device 502 in management data 510. The registration information includes the identity and state of device 502. Management server 508 establishes a mailbox 512 for the newly registered remotely managed device 502. Management server 506 also transmits a message 514 acknowledging successful registration of remotely managed device 502 to the device.

In step 406, management server 508 places commands intended for remotely managed device 502 in mailbox 512. Such commands may include, for example:
- enabling/disabling access of the remotely managed device to the server
- enabling/disabling applications that may run on the remotely managed device
- erasing all or part of the device contents, such as programs and data
- transmitting new programs and data to a device
- querying the current state of the device
- monitoring the level of the battery in the device
- monitoring the location of the device in the wireless network, including foreign networks.

In steps 408 and 410, the commands stored in mailbox 512 are delivered to the remotely managed device. In particular, in step 408, a connection 516 is established between management agent 504, running on remotely managed device 502, and management server 508. Upon connection 516 being established, the commands that were stored in mailbox 512 in step 406 are transmitted 518 to device 502. This protocol is applicable to both push and pull devices. A pull devices is a device that must request data before the data is transmitted to the device. A push device is a device to which data is transmitted without the device requesting the data, but which will nevertheless accept the data. In an embodiment in which remotely managed device 502 is a pull device, the management agent running on device 502 will occasionally connect to management server 508 and request the commands in mailbox 512. In an embodiment in which remotely managed device 502 is a push device, management server 508 will occasionally connect to remotely managed device 502 and transmit the commands in mailbox 512 to management agent 504. In both embodiments, the connections may be made periodically, based on some defined time interval, or they may be made based on predefined threshold conditions.

In step 410, management agent 504 executes the retrieved commands and transmits a notification message 520 that informs management server 508 of the results of executing each command. In addition, if one or more of the commands were to monitor parameters of remotely managed device 502, then, in step 412, management agent 504 will transmit the monitored information 522 to management server 508. The transmission may be periodic, based on some defined time interval, or they may be based on the values of certain parameters of device 502 in relation to predefined threshold conditions. The time intervals or threshold conditions may be inherent in device 502, or they may be transmitted as parameters or data related to the commands that were retrieved by device 502.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for remotely managing a wireless device over a wireless network comprising a server and the wireless device, the wireless network operable to communicatively connect the server and the wireless device, the method comprising the steps of:
   transmitting registration information relating to the wireless device from the wireless device to the server;
   verifying the registration information at the server; and
   without a request from the wireless device, performing the steps of:
   establishing a mailbox for the wireless device at the server,
   placing a command for the wireless device in the mailbox at the server,
   delivering the command from the mailbox at the server to the wireless device by establishing a connection between the wireless device and the server, transmitting the contents of the mailbox from the server to the wireless device, and accepting the contents of the mailbox at the wireless device, and
   executing the command at the wireless device;
   wherein the connection is established based on a threshold condition.

2. The method of claim 1, wherein the delivering step comprises the steps of:
   establishing a connection between the wireless device and the server;
   transmitting a request for contents of the mailbox from the wireless device to the server; and
   transmitting the contents of the mailbox from the server to the wireless device.

3. The method of claim 2, wherein the connection is established periodically.

4. The method of claim 1, wherein the connection is established periodically.

5. The method of claim 1, wherein the command comprises one of:
   enabling/disabling access of the wireless device to the server;
   enabling/disabling applications that may run on the wireless device;
   erasing all or part of contents of the wireless device;
   transmitting new programs and data to the wireless device;
   querying a current state of the wireless device;
   monitoring a level of a battery in the wireless device; and
   monitoring the location of the wireless device in the wireless network.

6. The method of claim 1, further comprising the step of:
   transmitting information relating to execution of the command at the wireless device from the wireless device to the server.

7. The method of claim 6, wherein the information relating to execution of the command is transmitted periodically.

8. The method of claim 6, wherein the information relating to execution of the command is transmitted based on a threshold condition of the wireless device.

9. A method for remotely managing a wireless device from a server over a wireless network comprising the steps of:
   receiving registration information from the wireless device at the server;
   verifying the received registration information at the server; and
   without a request from the wireless device, performing the steps of:
   placing a command for the wireless device in a mailbox at the server, and
   delivering the command to the wireless device from the server by establishing a connection with the wireless device, receiving a request for contents of the mailbox from the wireless device, and transmitting the contents of the mailbox to the wireless device; and
   wherein the connection is established based on a threshold condition.

10. The method of claim 9, wherein the connection is established periodically.

11. The method of claim 9, wherein the command comprises one of:
    enabling/disabling access of the wireless device to the server;
    enabling/disabling applications that may run on the wireless device;
    erasing all or part of contents of the wireless device;
    transmitting new programs and data to the wireless device;
    querying a current state of the wireless device;
    monitoring a level of a battery in the wireless device; and
    monitoring the location of the wireless device in the wireless network.

12. The method of claim 9, further comprising the step of:
    receiving information relating to execution of the command at the wireless device from the wireless device.

13. A system for remotely managing a wireless device over a wireless network, the system comprising:
    a processor operable to execute computer program instructions; and
    a memory operable to store computer program instructions executable by the processor, for performing the steps of:
    receiving registration information from the wireless device;
    verifying the received registration information; and
    without a request from the wireless device, performing the steps of:
    placing a command for the wireless device in a mailbox, and
    delivering the command to the wireless device by establishing a connection with the wireless device, receiving a request for contents of the mailbox from the wireless device, and transmitting the contents of the mailbox to the wireless device; and wherein the connection is established based on a threshold condition.

14. The system of claim 13, wherein the connection is established periodically.

15. The system of claim 13, wherein the command comprises one of:
  enabling/disabling access of the wireless device to the server;
  enabling/disabling applications that may run on the wireless device;
  erasing all or part of contents of the wireless device;
  transmitting new programs and data to the wireless device;
  querying a current state of the wireless device;
  monitoring a level of a battery in the wireless device; and
  monitoring the location of the wireless device in the wireless network.

16. The system of claim 13, further comprising the step of:
  receiving information relating to execution of the command at the wireless device from the wireless device.

17. A computer program product for remotely managing a wireless device over a wireless network, comprising:
  a computer readable medium;
  computer program instructions, recorded on the computer readable medium, executable by a processor, for performing the steps of
  receiving registration information from the wireless device;
  verifying the received registration information; and
  without a request from the wireless device, performing the steps of:
  placing a command for the wireless device in a mailbox, and
  delivering the command to the wireless device by establishing a connection with the wireless device, receiving a request for contents of the mailbox from the wireless device, and transmitting the contents of the mailbox to the wireless device; and
  wherein the connection is established based on a threshold condition.

18. The computer program product of claim 17, wherein the connection is established periodically.

19. The computer program product of claim 17, wherein the command comprises one of:
  enabling/disabling access of the wireless device to the server;
  enabling/disabling applications that may run on the wireless device;
  erasing all or part of contents of the wireless device;
  transmitting new programs and data to the wireless device;
  querying a current state of the wireless device;
  monitoring a level of a battery in the wireless device; and
  monitoring the location of the wireless device in the wireless network.

20. The computer program product of claim 17, further comprising the step of:
  receiving information relating to execution of the command at the wireless device from the wireless device.

21. The method of claim 1, wherein the command comprises enabling/disabling access of the wireless device to the server.

22. The method of claim 1, wherein the command comprises enabling/disabling applications that may run on the wireless device.

23. The method of claim 1, wherein the command comprises erasing all or part of contents of the wireless device.

24. The method of claim 1, wherein the command comprises transmitting new programs and data to the wireless device.

25. The method of claim 1, wherein the command comprises querying a current state of the wireless device.

26. The method of claim 1, wherein the command comprises monitoring a level of a battery in the wireless device.

27. The method of claim 1, wherein the command comprises monitoring a location of the wireless device in the wireless network.

28. The method of claim 9, wherein the command comprises enabling/disabling access of the wireless device to the server.

29. The method of claim 9, wherein the command comprises enabling/disabling applications that may run on the wireless device.

30. The method of claim 9, wherein the command comprises erasing all or part of contents of the wireless device.

31. The method of claim 9, wherein the command comprises transmitting new programs and data to the wireless device.

32. The method of claim 9, wherein the command comprises querying a current state of the wireless device.

33. The method of claim 9, wherein the command comprises monitoring a level of a battery in the wireless device.

34. The method of claim 9, wherein the command comprises monitoring a location of the wireless device in the wireless network.

35. The system of claim 13, wherein the command comprises enabling/disabling access of the wireless device to the server.

36. The system of claim 13, wherein the command comprises enabling/disabling applications that may run on the wireless device.

37. The system of claim 13, wherein the command comprises erasing all or part of contents of the wireless device.

38. The system of claim 13, wherein the command comprises transmitting new programs and data to the wireless device.

39. The system of claim 13, wherein the command comprises querying a current state of the wireless device.

40. The system of claim 13, wherein the command comprises monitoring a level of a battery in the wireless device.

41. The system of claim 13, wherein the command comprises monitoring a location of the wireless device in the wireless network.

42. The computer program product of claim 17, wherein the command comprises enabling/disabling access of the wireless device to the server.

43. The computer program product of claim 17, wherein the command comprises enabling/disabling applications that may run on the wireless device.

44. The computer program product of claim 17, wherein the command comprises erasing all or part of contents of the wireless device.

45. The computer program product of claim 17, wherein the command comprises transmitting new programs and data to the wireless device.

46. The computer program product of claim 17, wherein the command comprises querying a current state of the wireless device.

47. The computer program product of claim 17, wherein the command comprises monitoring a level of a battery in the wireless device.

48. The computer program product of claim 17, wherein the command comprises monitoring a location of the wireless device in the wireless network.

* * * * *